US009462239B2

(12) United States Patent
Liu et al.

(10) Patent No.: US 9,462,239 B2
(45) Date of Patent: Oct. 4, 2016

(54) SYSTEMS AND METHODS FOR TIME-MULTIPLEXING TEMPORAL PIXEL-LOCATION DATA AND REGULAR IMAGE PROJECTION FOR INTERACTIVE PROJECTION

(71) Applicant: FUJI XEROX CO., LTD., Tokyo (JP)

(72) Inventors: Qiong Liu, Cupertino, CA (US); Hao Tang, Sunnyvale, CA (US); Patrick Chiu, Mountain View, CA (US); Shang Ma, Palo Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 7 days.

(21) Appl. No.: 14/332,370

(22) Filed: Jul. 15, 2014

(65) Prior Publication Data
US 2016/0021346 A1    Jan. 21, 2016

(51) Int. Cl.
*H04N 9/31* (2006.01)
*G06F 3/03* (2006.01)
*G06K 9/20* (2006.01)

(52) U.S. Cl.
CPC ............. *H04N 9/3105* (2013.01); *G06F 3/03* (2013.01); *G06K 9/2054* (2013.01); *H04N 9/3155* (2013.01)

(58) Field of Classification Search
CPC .................................................. H04N 9/3105
See application file for complete search history.

(56) References Cited

U.S. PATENT DOCUMENTS

| | | | | |
|---|---|---|---|---|
| 6,301,044 B1 * | 10/2001 | Huber | ..................... | G02B 27/26 348/E13.037 |
| 6,345,116 B1 * | 2/2002 | Kojima | ................ | H04N 1/3876 358/518 |
| 7,933,809 B2 * | 4/2011 | Abraham | ............... | G06Q 30/02 705/26.1 |
| 8,018,579 B1 * | 9/2011 | Krah | ...................... | G01B 11/00 356/4.01 |
| 8,217,997 B2 * | 7/2012 | Solomon | ............... | G06F 3/0321 348/63 |
| 8,878,858 B2 * | 11/2014 | Posa | ..................... | G09G 3/001 345/501 |
| 9,153,175 B2 * | 10/2015 | Song | .................... | G09G 3/3258 |

(Continued)

OTHER PUBLICATIONS

Johnny Lee et al. Hybrid infrared and visible light projection for location tracking. Proc. of the 20th ann. symp. on User Interf. (UIST '07). ACM New York, NY, USA, 57-60.

(Continued)

*Primary Examiner* — Brian Yenke
(74) *Attorney, Agent, or Firm* — TransPacific Law Group; Pavel I. Pogodin, Esq.

(57) ABSTRACT

A system and method for generating a projected image signal encoded with position information. The temporal pixel-location data is hidden within visible light signal used for regular image projection. This enables the user to utilize one or multiple ring-shaped light receivers to implement touch or multi-touch functions on a regular image content generated using light from the same projector. The temporal light signal generated by the projector is sliced into multiple temporal segments. The segments include segments of two different types. A segment of the first type is used for carrying a temporal position signal of each pixel in the projector signal. On the other hand, a segment of the second type is used to adjust the color of each pixel. With the color adjustment segment projected to each image pixel, a meaningful visible content of a regular image can be displayed despite the presence of the position-encoded signal segments.

19 Claims, 6 Drawing Sheets

(56) References Cited

U.S. PATENT DOCUMENTS

| | | | |
|---|---|---|---|
| 2002/0064306 A1* | 5/2002 | Pilz | H04N 1/64 382/166 |
| 2002/0122042 A1* | 9/2002 | Bates | G06F 17/30855 345/581 |
| 2003/0095138 A1* | 5/2003 | Kim | H04N 9/73 345/690 |
| 2004/0222987 A1* | 11/2004 | Chang | G01B 11/2509 345/419 |
| 2006/0215907 A1* | 9/2006 | Shefer | H04N 1/646 382/166 |
| 2006/0269136 A1* | 11/2006 | Squires | G06K 7/1443 382/181 |
| 2007/0005795 A1* | 1/2007 | Gonzalez | G06F 17/30017 709/232 |
| 2007/0046924 A1* | 3/2007 | Chang | G01C 7/00 356/3.01 |
| 2007/0091434 A1* | 4/2007 | Garner | H04N 5/74 359/459 |
| 2007/0206204 A1* | 9/2007 | Jia | G01N 11/254 356/604 |
| 2007/0247519 A1* | 10/2007 | Riaziat | G09F 19/12 348/37 |
| 2008/0025631 A1* | 1/2008 | Neal | G06K 9/00456 382/260 |
| 2008/0158268 A1* | 7/2008 | Hui | G09G 3/2022 345/691 |
| 2009/0184976 A1* | 7/2009 | Chen | G09G 3/2003 345/604 |
| 2010/0316389 A1* | 12/2010 | Walewski | H04B 10/1141 398/130 |
| 2011/0055729 A1* | 3/2011 | Mason | G06F 3/0425 715/753 |
| 2011/0164191 A1* | 7/2011 | Brown | G06K 9/50 348/744 |
| 2011/0181553 A1* | 7/2011 | Brown | G06F 3/0425 345/175 |
| 2011/0292299 A1* | 12/2011 | Lau et al. | 348/734 |
| 2012/0038892 A1* | 2/2012 | Kurtz et al. | 353/31 |
| 2012/0307897 A1* | 12/2012 | Yang | H04N 19/50 375/240.12 |
| 2013/0076763 A1* | 3/2013 | Messmer | H04N 1/6058 345/506 |
| 2013/0187954 A1* | 7/2013 | Saito | G02B 21/365 345/634 |
| 2013/0215132 A1* | 8/2013 | Fong | G06F 3/011 345/582 |
| 2014/0022169 A1* | 1/2014 | Stern | G06F 3/033 345/157 |
| 2014/0022196 A1* | 1/2014 | Henry | G06K 9/3258 345/173 |
| 2014/0043352 A1* | 2/2014 | Damberg | H04N 9/3147 345/589 |
| 2014/0071116 A1* | 3/2014 | Johansson | G06T 19/006 345/419 |
| 2015/0212595 A1* | 7/2015 | Liu | G06F 3/0321 345/156 |
| 2015/0221280 A1* | 8/2015 | Van Der Vleuten | H04N 1/6027 382/167 |
| 2015/0245103 A1* | 8/2015 | Conte | H04N 21/47815 725/60 |
| 2015/0262410 A1* | 9/2015 | Arun | G06F 9/4881 345/419 |
| 2015/0281507 A1* | 10/2015 | Konen | G06K 9/00664 348/231.6 |
| 2015/0281702 A1* | 10/2015 | Chang | H04N 19/186 382/166 |

OTHER PUBLICATIONS

Johnny C. Lee et al. Moveable interactive projected displays using projector based tracking. Proc. of 18th ann. symp. on User Interf. (UIST '05). ACM, New York, NY, USA, 63-72.

* cited by examiner

SYSTEMS AND METHODS FOR TIME-MULTIPLEXING TEMPORAL PIXEL-LOCATION DATA AND REGULAR IMAGE PROJECTION FOR INTERACTIVE PROJECTION

BACKGROUND OF THE INVENTION

1. Technical Field

The disclosed embodiments relate in general to systems and methods for user-computer system interaction and, more specifically, to systems and methods for time-multiplexing temporal pixel-location data and regular image projection for interactive projection.

2. Description of the Related Art

Many applications of user-computer interaction systems require tracking of a location of an object, such as user's smartphone. For example, a user may place his smartphone next to an item in a museum or a store in order to receive additional information about that item. The system tracks the location of the user's smartphone and uses the determined location to identify the item of interest to the user in order to retrieve and provide to the user the additional information about the item. A similar system may be used to enable user's interaction with a projected public display, wherein a user interface is projected on a surface. The user interacts with such a display by performing gestures using his or her smartphone.

In the above-referenced user-computer interaction systems, the location of the user's smartphone is determined using coded lighting generated by a projector. As would be appreciated by persons of ordinary skill in the art, to enable such a system to function properly, the projector must be registered with the real-life objects, monitoring camera, or other tracking systems.

For projected augmented reality and augmented worktables, researchers explored many different approaches to register projector with real world objects, monitoring camera, or other tracking systems. As would be appreciated by persons of ordinary skill in the art, to perfectly align the regular image projection system and the tracking system, it is advantageous to have the signal for position-tracking and regular image go through the same light engine. This approach can greatly reduce problems encountered during real system deployment.

For example, Lee et al. proposed unifying tracking and projection by introducing an infrared (IR) channel beyond visible channel in his projection system, see Johnny Lee, Scott Hudson, and Paul Dietz, "Hybrid infrared and visible light projection for location tracking", In Proceedings of the 20th annual ACM symposium on User interface software and technology (UIST '07), ACM, New York, N.Y., USA, 57-60. However, this system requires a modification of the projector's light engine, which is expensive to perform in many commercially available projector systems. Moreover, the extra IR channel needs to be perfectly aligned with visible channels during light engine manufacturing process. As would be appreciated by persons of ordinary skill in the art, all these light engine physical changes will result in a significant cost increase of the light engine manufacturing.

Thus, new and improved systems and methods are needed that would provide a position-encoded image signal using a projector having the image generating light signal aligned with the light signal carrying the position information.

SUMMARY OF THE INVENTION

The embodiments described herein are directed to systems and methods that substantially obviate one or more of the above and other problems associated with the conventional technology for providing position-encoded light signal.

In accordance with one aspect of the embodiments described herein, there is provided a computer-implemented method performed in connection with a computerized system comprising a processing unit, a memory and a projector, the computer-implemented method involving: receiving an image data, the image data comprising at least a color value for each of a plurality of pixels of an image, the color value representing a color of said each of the plurality of image pixels, wherein each of the plurality of image pixels is characterized by pixel coordinates; and causing the projector to project a temporal light signal to create a projection of the image on a projection surface, wherein the temporal projector light signal comprises, for each image pixel of the plurality of image pixels, a temporal position information segment encoded with the pixel coordinates of said each image pixel and a color compensation segment configured to reproduce substantially the color of said each image pixel of the plurality of image pixels on the projection surface.

In one or more embodiments, the pixel coordinates are descriptive of a location of the pixel within the image.

In one or more embodiments, the pixel coordinates are descriptive of a location of the pixel within a coordinate system of the projector.

In one or more embodiments, the temporal position information segment is encoded with the pixel coordinates using a sequential binary code comprising a sequential plurality of light pulses.

In one or more embodiments, in the sequential binary code, a first binary digit is represented by a first light pulse followed by a first pause and a second binary digit is represented by a second pause followed by a second light pulse.

In one or more embodiments, the sequential plurality of light pulses of the temporal position information segment are generated using a white color light.

In one or more embodiments, the color compensation segment comprises a sequential plurality of light pulses of a plurality of light colors.

In one or more embodiments, the light pulses in the sequential plurality of light pulses have widths determined based on the color value of the corresponding image pixel.

In one or more embodiments, the sequential plurality of light pulses comprises a red light pulse, a green light pulse and a blue light pulse, wherein the widths of the red light pulse, the green light pulse and the blue light pulse are determined based on the color value of the corresponding image pixel in an RGB color space.

In one or more embodiments, the method additionally involves detecting the temporal light signal using a mobile device positioned within an illumination field of the projector and determining a position of the mobile device based on the temporal position information segment of the detected temporal light signal.

In one or more embodiments, the method additionally involves using the determined position of the mobile device to cause the computerized system or the mobile device to perform a predetermined action.

In accordance with another aspect of the embodiments described herein, there is provided a non-transitory computer-readable medium embodying a set of computer-executable instructions, which, when executed in connection with a computerized system comprising a processing unit, a memory and a projector, cause the computerized system to perform a method involving: receiving an image data, the image data comprising at least a color value for each of a plurality of pixels of an image, the color value representing a color of said each of the plurality of image pixels, wherein each of the plurality of image pixels is characterized by pixel coordinates; and causing the projector to project a temporal light signal to create a projection of the image on a projection surface, wherein the temporal projector light signal comprises, for each image pixel of the plurality of image pixels, a temporal position information segment encoded with the pixel coordinates of said each image pixel and a color compensation segment configured to reproduce substantially the color of said each image pixel of the plurality of image pixels on the projection surface.

In one or more embodiments, the temporal position information segment is encoded with the pixel coordinates using a sequential binary code comprising a sequential plurality of light pulses.

In one or more embodiments, in the sequential binary code, a first binary digit is represented by a first light pulse followed by a first pause and a second binary digit is represented by a second pause followed by a second light pulse.

In one or more embodiments, the sequential plurality of light pulses of the temporal position information segment are generated using a white color light.

In one or more embodiments, the color compensation segment comprises a sequential plurality of light pulses of a plurality of light colors.

In one or more embodiments, the light pulses in the sequential plurality of light pulses have widths determined based on the color value of the corresponding image pixel.

In one or more embodiments, the sequential plurality of light pulses comprises a red light pulse, a green light pulse and a blue light pulse, wherein the widths of the red light pulse, the green light pulse and the blue light pulse are determined based on the color value of the corresponding image pixel in an RGB color space.

In accordance with another yet aspect of the embodiments described herein, there is provided a computerized system comprising a processing unit, a projector and a memory storing a set of instructions, the set of instructions including instructions for: receiving an image data, the image data comprising at least a color value for each of a plurality of pixels of an image, the color value representing a color of said each of the plurality of image pixels, wherein each of the plurality of image pixels is characterized by pixel coordinates; and causing the projector to project a temporal light signal to create a projection of the image on a projection surface, wherein the temporal projector light signal comprises, for each image pixel of the plurality of image pixels, a temporal position information segment encoded with the pixel coordinates of said each image pixel and a color compensation segment configured to reproduce substantially the color of said each image pixel of the plurality of image pixels on the projection surface.

In one or more embodiments, the temporal position information segment is encoded with the pixel coordinates using a sequential binary code comprising a sequential plurality of light pulses.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided a computerized system and a computer-implemented method for generating a projected image signal encoded with position information. In one or more embodiments, the temporal pixel-location data is hidden within the visible light signal used for regular image projection. As would be appreciated by persons of ordinary skill in the art, using the described technique, there is no need to modify the light engine of a conventional image projector and there is no need to filter out the visible light at the light receiver side. The embodiments of the described systems and methods enable the user to utilize one or multiple ring-shaped light receivers to implement touch or multi-touch functions on a regular image content generated using the light from the same projector.

In one or more embodiments, the temporal light signal generated by the projector is sliced into multiple temporal segments. In various embodiments, the aforesaid segments include segments of two different types. A segment of the first type is used for carrying a temporal position signal of each pixel in the projector signal. On the other hand, a segment of the second type is used to adjust the color of each pixel. As would be appreciated by persons of ordinary skill in the art, with the color adjustment segment projected to each image pixel, a meaningful visible content of a regular image can be displayed despite the presence of the position-encoded signal segments.

Figure 1:
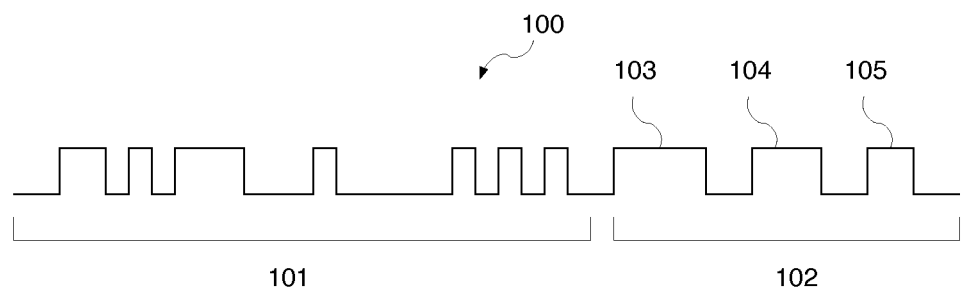
FIG. 1 illustrates an exemplary embodiment of a temporal projector light signal in accordance with one or more embodiments described herein.

FIG. 1 illustrates an exemplary embodiment of a temporal projector light signal 100 in accordance with one or more embodiments described herein. As shown in FIG. 1, the exemplary temporal projector light signal 100 incorporates a first temporal segment 101 carrying the position information and a second color compensation temporal segment 102. In other words, in the temporal projector light signal 100 the pixel location information and the regular image projection are time-multiplexed.

In one or more embodiments, the position information is encoded into the position information segment 101 using a sequential binary code. In one embodiment, the aforesaid binary code uses sequence "01" to represent 0 and sequence "10" to represent 1, such that the position information segment 101 will result in a constant luminosity value at every pixel independently of the position information encoded in the segment 101. In one or more embodiments, the position information segment 101 for each pixel is encoded with two values: a horizontal and vertical position of the pixel within the projector's illumination field. The encoded coordinates of the pixel may be coordinates in the image coordinate system, the coordinate system of the projector or any other coordinate system. In addition, the image may be segmented into image elements other than the aforesaid image pixels and coordinates of such image elements may be encoded into the position information segments 101. In one embodiment, position information segments 101 corresponding to pixels within the image element will be identical or at least have the same encoded coordinates.

In one or more embodiments, in addition to the pixel horizontal and vertical coordinates, the position information segment 101 may be encoded with certain additional information, such as identification information (ID) of the system, system time, date, global positioning system (GPS) coordinates of the projector or the system, other location information, such as street address, and the like.

In one or more embodiments, the color compensation segment 102 incorporates sequential color compensation pulses 103, 104 and 105 for compensating the resulting color of the projected pixel. To this end, the resulting color of the projected pixel is determined by the relative width of the color pulses 103, 104 and 105 using the pulse-width modulation techniques well known to persons of ordinary skill in the art. Specifically, the wider is the width of a pulse corresponding to a specific color, the more of this color will be present in the resulting projected pixel.

In one or more embodiments, the color may be encoded using RGB or any other now known or later developed color encoding methodologies. Therefore, the inventive concepts described herein are not limited to any specific color encoding schema. It should be noted that the sequential color pulses 103, 104 and 105 shown in FIG. 1 correspond to the three primary colors encoding schema, such as the aforesaid RGB technique. On the other hand, if the color encoding uses a different number of primary colors, then the number of the sequential color pulses will be different, matching the number of the primary colors in the color encoding schema.

In one or more embodiments, the widths of the color compensation pulses 103, 104 and 105 may be proportional to the corresponding color values in the pixel color encoding schema of the image to be projected, such as RGB color encoding well known to persons of ordinary skill in the art. For example, the width of the color compensation pulse 103 of a pixel in a projected image would be proportional to the red color value in the RGB color code for that pixel.

In one or more embodiments, depending on the color image contrast requirements and the position tracking speed requirements, the time duration ratio of the position information segment 101 and the color compensation segment 102 may be adjusted either manually or automatically by the system. In another embodiment, each position information segment 101 may be followed by two, three, four or more color compensation segments 102, depending on the position tracking speed requirements.

Figure 2:
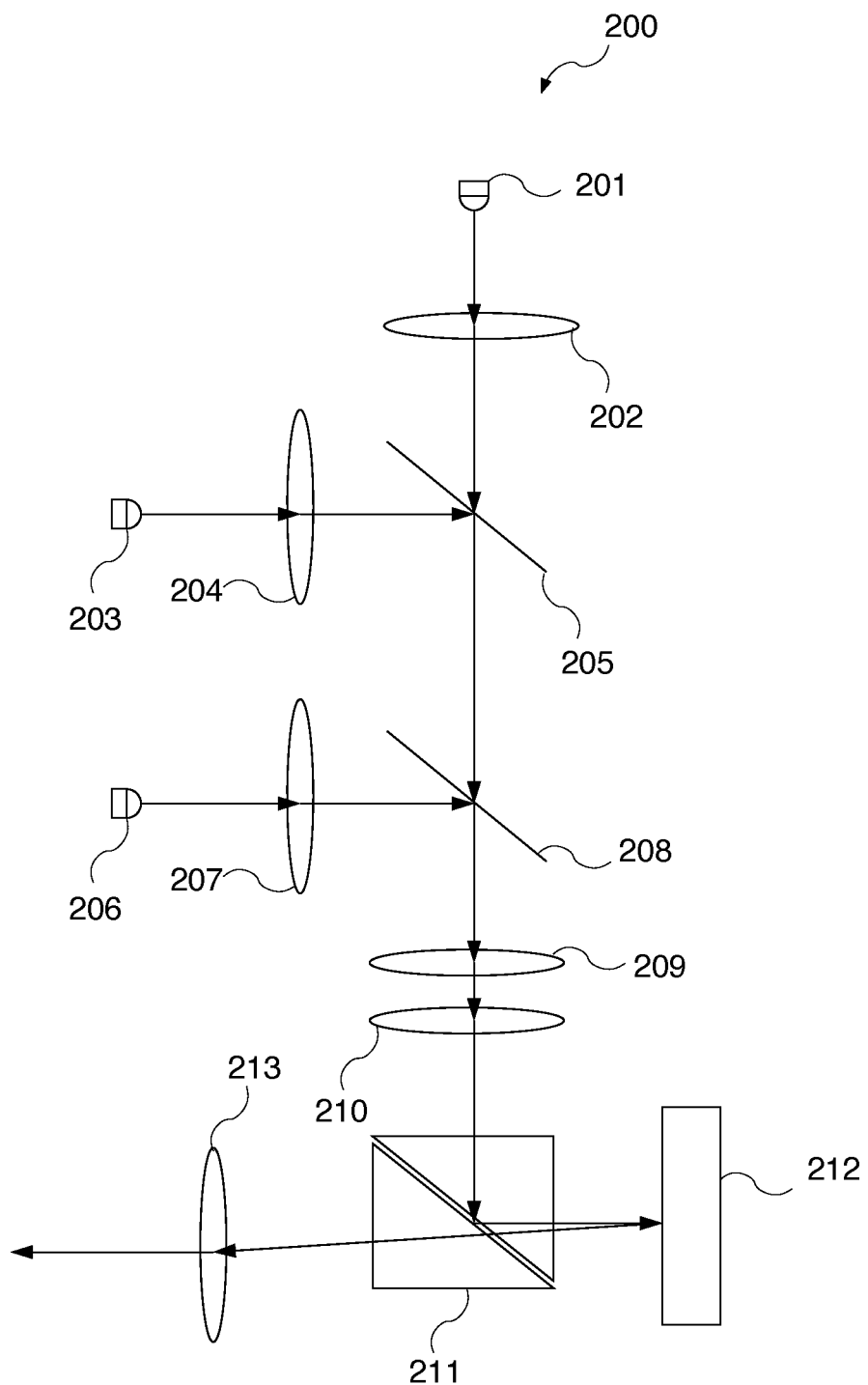
FIG. 2 illustrates an exemplary embodiment of a digital light processing (DLP) projector using which an embodiment of the described system and method for generating a projected image light signal encoded with position information may be implemented.

FIG. 2 illustrates an exemplary embodiment of a digital light processing (DLP) projector 200 using which an embodiment of the described system and method for generating a projected image light signal encoded with position information may be implemented. The embodiment of the DLP projector 200 shown in FIG. 2 incorporates three light sources 201, 203 and 206, which could be light emitting diodes (LEDs), well known to persons of ordinary skill in the art. In one or more embodiments, the three light sources 201, 203 and 206 correspond to each of the primary colors, such as red (R), green (G) or blue (B).

The light beams generated by the three light sources 201, 203 and 206 pass through collection lenses 202, 204 and 207, respectively, which direct the light generated by the LEDs 201, 203 and 206 to the imager. The three resulting light beams are combined together using dichroic mirrors 205 and 208 and the resulting combined light beam passes through the relay lenses 209 and 210 and is directed by a total internal reflection (TIR) prism 211 (a combination of two prisms) onto a digital micromirror device (DMD) 212. The DMD 212, which consists of several hundred thousand microscopic mirrors arranged in a rectangular array, selectively reflects the light through the projector lens 213 to generate the resulting image on a remote projection surface (not shown).

It should be noted that the inventive concepts described herein are not limited to LED-based projectors or DLP projectors described above and any other suitable projector systems may be used for implementing the described embodiments.

Figure 3:
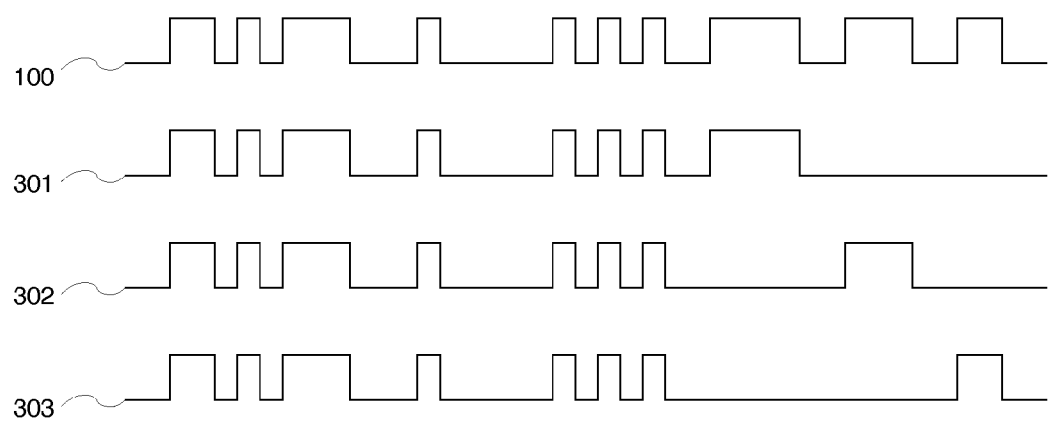
FIG. 3 illustrates exemplary embodiments of electrical driving signals applied to the three light sources of a DLP projector as well as the resulting temporal projector light signal encoded with position information.

FIG. 3 illustrates exemplary embodiments of electrical driving signals 301, 302 and 303 applied to the three light sources 201, 203 and 206, respectively, as well as the resulting temporal projector light signal 100 encoded with position information. As shown in FIG. 3, each of the electrical driving signals 301, 302 and 303 incorporates an identical position information segment (see segment 101 shown in FIG. 1) as well as separate color compensation pulses of varying widths. Combining the light signals produced by the light sources 201, 203 and 206 in response to the electrical driving signals 301, 302 and 303 results in the temporal projector light signal 100, which is also illustrated in FIG. 1.

Figure 4A:
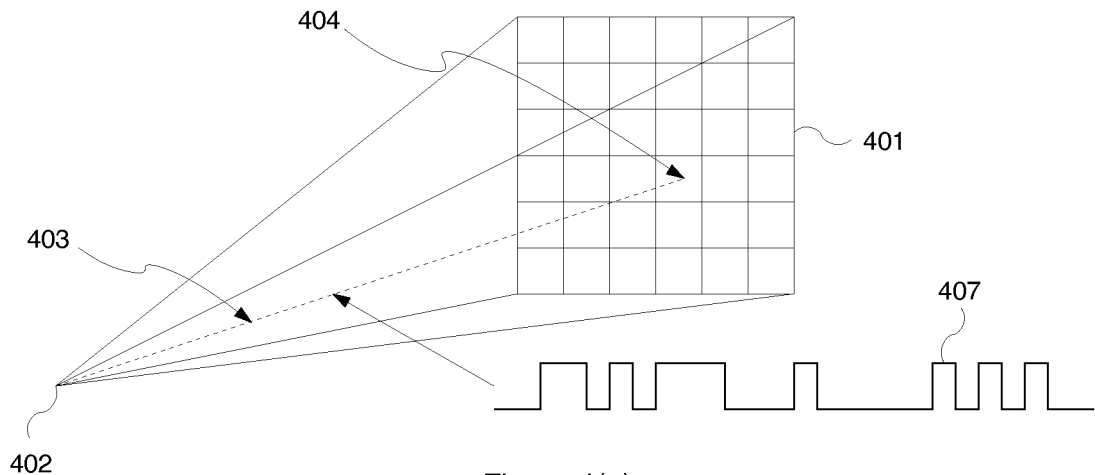
FIGS. 4(a) and 4(b) illustrate two temporal light signals produced by the digital light processing (DLP) projector, such as the DLP projector, for two different image pixels, in accordance with one or more embodiments of the systems and methods for generating a projected image light signal encoded with position information described herein.
Figure 4B:
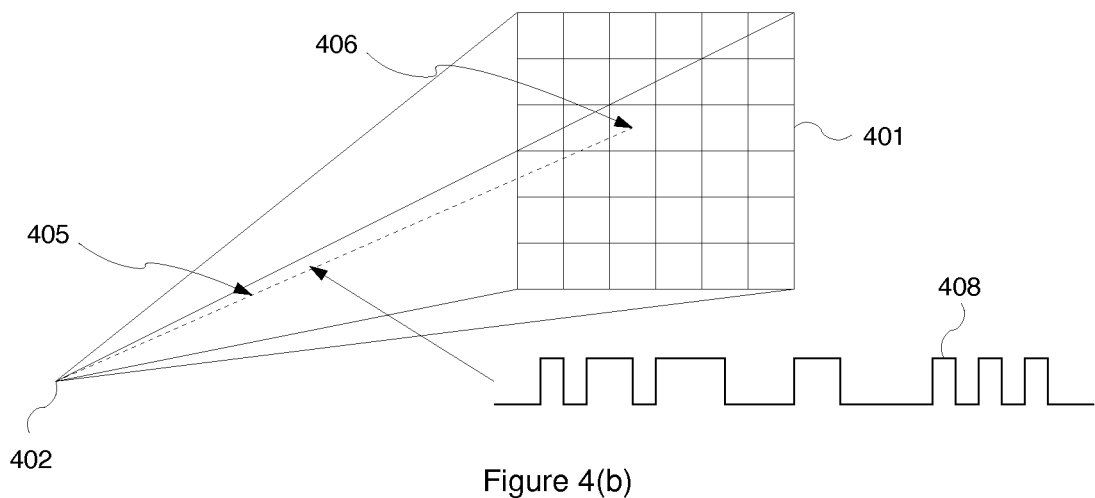

FIGS. 4(*a*) and 4(*b*) illustrate two temporal light signals produced by the digital light processing (DLP) projector, such as the DLP projector 200, for two different image pixels, in accordance with one or more embodiments of the systems and methods for generating a projected image light signal encoded with position information described herein. As shown in FIGS. 4(*a*) and 4(*b*), a projector 402 creates an image on a projection surface 401. As shown in FIG. 4(*a*), a light ray 403 creates an image pixel 404 on the projection surface 401. Numeral 407 designates a temporal projector light signal 100 corresponding to the image pixel 404. This temporal projector light signal 100 is encoded with the position information of the image pixel 404 and additionally carries the sequential color compensation pulses described above. On the other hand, as shown in FIG. 4(*b*), a light ray 405 creates an image pixel 406 on the projection surface 401. Numeral 408 designates a temporal projector light signal 100 corresponding to the image pixel 406, which similarly includes the position information of the image pixel 406 as well as the sequential color compensation pulses.

Figure 5:
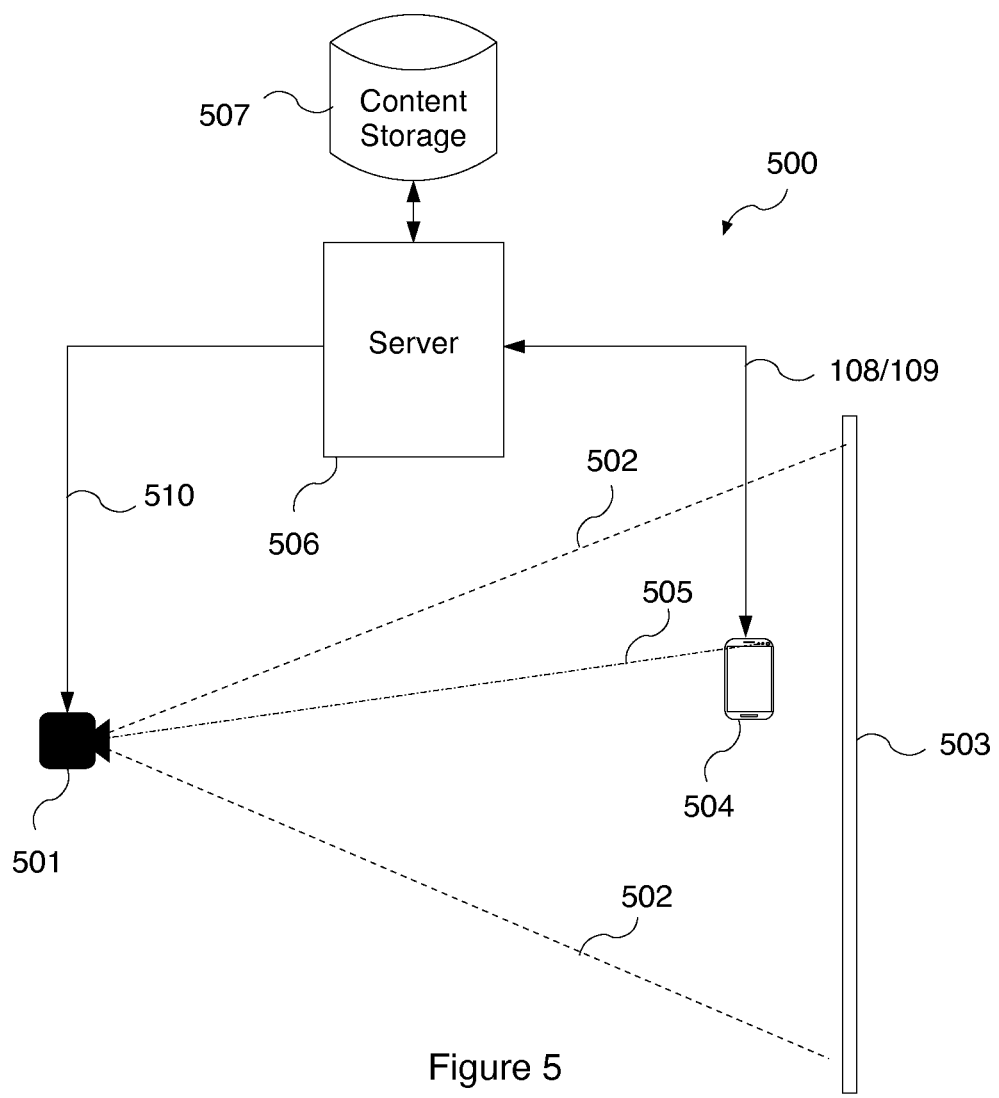
FIG. 5 illustrates an exemplary embodiment of a user-computer interaction system implemented using one or more embodiments of the systems and methods for generating a projected image light signal encoded with position information described herein.

FIG. 5 illustrates an exemplary embodiment of a user-computer interaction system 500 implemented using one or more embodiments of the systems and methods for generating a projected image light signal encoded with position information described herein. In the embodiment shown in FIG. 5, a projector 501 creates an image on a remote projection surface 503 placed within its illumination field 502. In one or more embodiments, the recreated image may be an image of a graphical user interface. The light emitted by the projector 501 is encoded with the appropriate coordinate information of the corresponding pixel or a group of pixels within the projector illumination field 502. In one or more embodiments, the coordinate information is encoded in the illumination light of the projector 501 in a form of timed light pulses carrying information of the respective pixel coordinates. In one or more embodiments, the system 500 may include two or more projectors 501 with their illumination fields 502 stitched together or their coded light signals time-multiplexed.

To interact with the displayed user interface or other projected image, the user positions a mobile device 504 in front of the projection surface 503. The light sensor (not shown) of the so positioned mobile device 504 receives a coded light ray 505 from the projector 501. In one or more embodiments, the aforesaid light sensor may be the camera unit of the mobile device 504. In another embodiment, a dedicated luminosity sensor may be used.

In one or more embodiments, the light emitted by the projector 501 is coded with the coordinates of the corresponding pixel within the illumination field of view of the projector 501. The light sensor of the user's mobile device 504 detects the coded light 505 from the projector 501 and the respective pixel coordinates are extracted from the detected light signal. In one or more embodiments, the coded light 505 may be detected by the conventional camera of the user's mobile device 504 or by a specialized luminosity sensor. In one embodiment, the coordinate information extracted from the detected light signal may be used by the mobile application running on the user's mobile device 504 to request additional information from a server 506, which corresponds to a portion of the projected image of interest to the user. For example, a video of a geographical location corresponding to a specific location on a map may be requested by placing the user's mobile device 504 next to the corresponding map point. The mobile device 504 determines the position of a point on the map of interest to the user using the coded lighting and requests the additional information corresponding to the detected map location.

To this end, in one or more embodiments, the mobile device 504 may send a request 508 to the server 506, the request including the location information for retrieving the associated digital content. In one or more embodiments, the aforesaid request is an HTTP protocol request sent over a computer network.

In response, the server 506 retrieves, based on the location information contained in the received request, the digital associated with the point of interest to the user from a digital content storage 507. In one or more embodiments, the digital content storage 507 is a database, such as a relational database system of any now known or later developed design. The retrieved digital content 509 is then sent to the user's mobile device 504 via the network. Finally, the software residing on the server 506 may send control signals and/or projected image content 510 to the projector 501.

In another embodiment, the mobile device 504 transmits the detected coordinate information to the server 506, which uses this information to detect user's gestures performed in connection with the projected image. The detected gestures, in turn, may be used for enabling user interaction with the server system 506.

Figure 6:
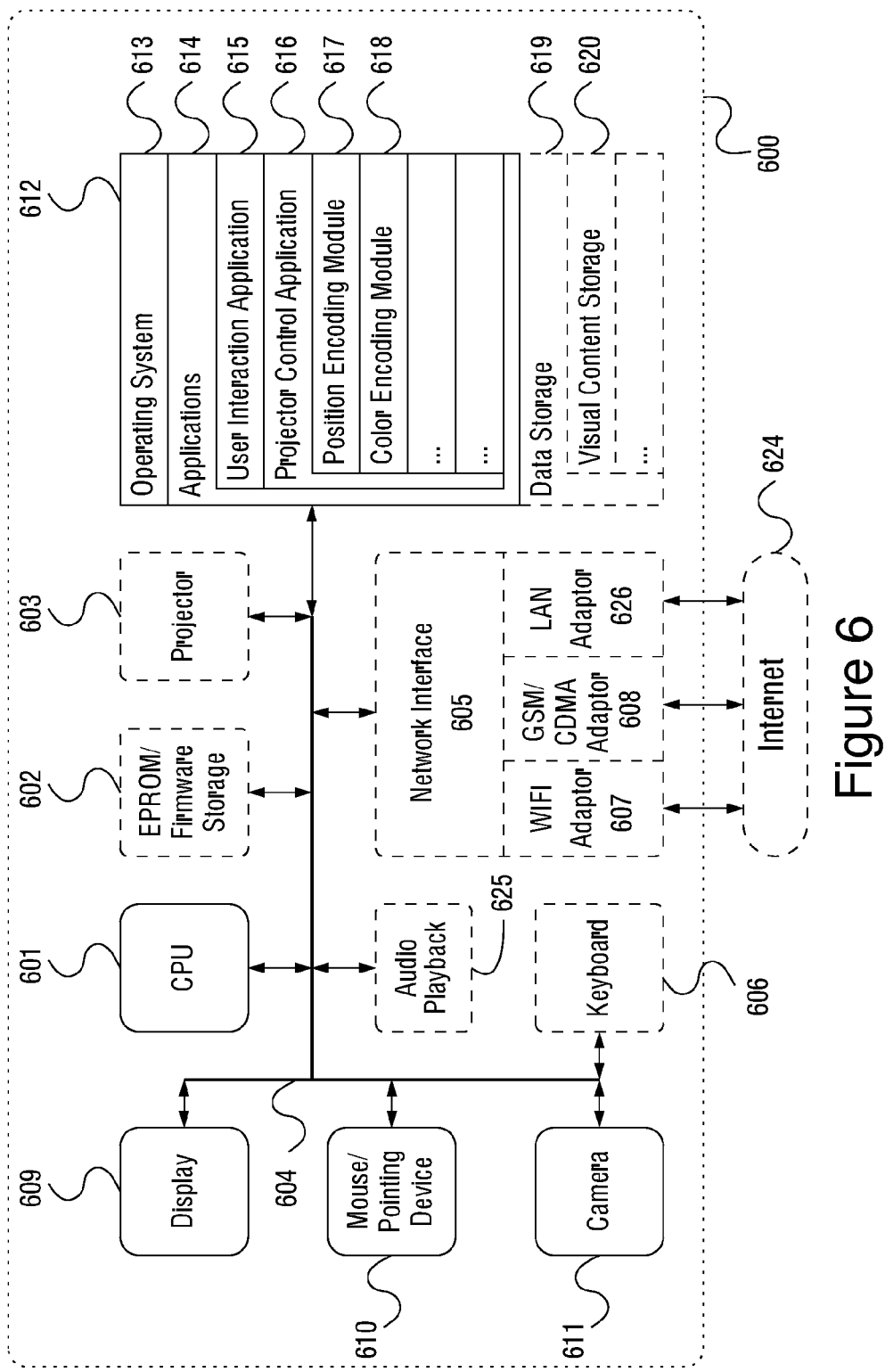
FIG. 6 illustrates an exemplary embodiment of a computerized system for generating a projected image light signal encoded with position information.

FIG. 6 illustrates an exemplary embodiment of a computerized system 600 for generating a projected image light signal encoded with position information. In one or more embodiments, the computerized system 600 may be implemented within the form factor of a mobile computing device, such as a smartphone, a personal digital assistant (PDA), or a tablet computer, all of which are available commercially and are well known to persons of skill in the art. In an alternative embodiment, the computerized system 600 may be implemented based on a laptop or a notebook computer. Yet in an alternative embodiment, the computerized system 600 may be an embedded system, incorporated into an electronic device with certain specialized functions, such as the DLP projector 200.

The computerized system 600 may include a data bus 604 or other interconnect or communication mechanism for communicating information across and among various hardware components of the computerized system 600, and a central processing unit (CPU or simply processor) 601 coupled with the data bus 604 for processing information and performing other computational and control tasks. Computerized system 600 also includes a memory 612, such as a random access memory (RAM) or other dynamic storage device, coupled to the data bus 604 for storing various information as well as instructions to be executed by the processor 601. The memory 612 may also include persistent storage devices, such as a magnetic disk, optical disk, solid-state flash memory device or other non-volatile solid-state storage devices.

In one or more embodiments, the memory 612 may also be used for storing temporary variables or other intermediate information during execution of instructions by the processor 601. Optionally, computerized system 600 may further include a read only memory (ROM or EPROM) 602 or other static storage device coupled to the data bus 604 for storing static information and instructions for the processor 601, such as firmware necessary for the operation of the computerized system 600, basic input-output system (BIOS), as well as various configuration parameters of the computerized system 600.

In one or more embodiments, the computerized system 600 may incorporate a display device 609, which may be also coupled to the data bus 604, for displaying various information to a user of the computerized system 600. In an alternative embodiment, the display device 609 may be associated with a graphics controller and/or graphics processor (not shown). The display device 609 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 609 may be incorporated into the same general enclosure with the remaining components of the computerized system 600. In an alternative embodiment, the display device 609 may be positioned outside of such enclosure.

In one or more embodiments, the computerized system 600 may incorporate an audio playback device 625 connected to the data bus 604 and configured to play various audio files and streams, such as MPEG-3 files, or audio tracks of various video files, such as MPEG-4 files, well known to persons of ordinary skill in the art. To this end, the computerized system 600 may also incorporate waive or sound processor or a similar device (not shown). In the described specific embodiments, the audio playback device 625 is configured to play to the user the live audio stream of the video conference.

In one or more embodiments, the computerized system 600 may incorporate one or more input devices, such as a mouse/pointing device 610 for receiving commands from the user, a camera 611 for acquiring still images and video of various objects, as well as a keyboard 606, which all may be coupled to the aforesaid data bus 604 for communicating information, including, without limitation, images and video, as well as user command selections to the processor 601.

In one or more embodiments, the computerized system 600 may include a projector 603 for projecting the temporal projector light signal 100 encoded with position information.

In one or more embodiments, the computerized system 600 may additionally include a communication interface, such as a network interface 605 coupled to the data bus 604. The network interface 605 may be configured to establish a connection between the computerized system 600 and the Internet 624 using at least one of WIFI interface 607 and the cellular network (GSM or CDMA) adaptor 608. The network interface 605 may be configured to provide a two-way data communication between the computerized system 600 and the Internet 624. The WIFI interface 607 may operate in compliance with 802.11a, 802.11b, 802.11g and/or 802.11n protocols as well as Bluetooth protocol well known to persons of ordinary skill in the art. In an exemplary implementation, the WIFI interface 607 and the cellular network (GSM or CDMA) adaptor 608 send and receive electrical or electromagnetic signals that carry digital data streams representing various types of information.

In one or more embodiments, the Internet 624 typically provides data communication through one or more sub-networks to other network resources. Thus, the computerized system 600 is capable of accessing a variety of network resources located anywhere on the Internet 624, such as remote media servers, web servers, other content servers as well as other network data storage resources. In one or more embodiments, the computerized system 600 is configured send and receive messages, media and other data, including application program code, through a variety of network(s) including Internet 624 by means of the network interface 605. In the Internet example, when the computerized system 600 acts as a network client, it may request code or data for an application program executing on the computerized system 600. Similarly, it may send various data or computer code to other network resources.

In one or more embodiments, the functionality described herein is implemented by computerized system 600 in response to processor 601 executing one or more sequences of one or more instructions contained in the memory 612. Such instructions may be read into the memory 612 from another computer-readable medium. Execution of the sequences of instructions contained in the memory 612 causes the processor 601 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 601 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 601 for execution. For example, the instructions may initially be carried on a magnetic disk from a remote computer. Alternatively, a remote computer can load the instructions into its dynamic memory and send the instructions over the Internet 624. Specifically, the computer instructions may be downloaded into the memory 612 of the computerized system 600 from the foresaid remote computer via the Internet 624 using a variety of network data communication protocols well known in the art.

In one or more embodiments, the memory 612 of the computerized system 600 may store any of the following software programs, applications or modules:

1. Operating system (OS) 613, which may be an operating system for implementing basic system services and managing various hardware components of the computerized system 600. Exemplary embodiments of the operating system 613 are well known to persons of skill in the art, and may include any now known or later developed mobile operating systems.

2. Applications 614 may include, for example, a set of software applications executed by the processor 601 of the computerized system 600, which cause the computerized system 600 to perform certain predetermined functions, such as cause the projector 603 to generate the position-encoded image light signal. In one or more embodiments, the applications 614 may include an inventive user interaction application 615, as well as an inventive projector control application 616, described in detail below.

3. Data storage 619 may be used, for example, for storing the visual content 620.

In one or more embodiments, the inventive user interaction application 615 uses the position information extracted from the temporal projector light signal 100 to detect user gestures and enable user interaction with the computerized system 600 using the detected gestures. On the other hand, the projector control application 616 causes the projector 603 to display the temporal projector light signal 100 described above. In various embodiments, the projector control application 616 may incorporate a position encoding module 617 for encoding pixel coordinates in order to generate the position information segment 101 illustrated above in connection with FIG. 1. In addition, the projector control application 616 may incorporate a color encoding module 618 for encoding pixel color information in order to generate the color compensation segment 102 illustrated above in connection with FIG. 1.

It should be noted that the computerized system 600 described above is exemplary only and any other suitable computerized system may be used to implement the described embodiments.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for providing position-encoded image signal using a projector. It is intended that the specification and examples be considered as exemplary only, with a true scope and spirit of the invention being indicated by the following claims.

What is claimed is:

1. A computer-implemented method performed in connection with a computerized system comprising a processing unit, a memory and a projector, the computer-implemented method comprising:
   a. receiving an image data, the image data comprising at least a color value for each of a plurality of pixels of an image, the color value representing a color of said each of the plurality of image pixels, wherein each of the plurality of image pixels is characterized by pixel coordinates;
   b. causing the projector to project a temporal light signal to create a projection of the image on a projection surface;
   c. encoding the temporal projector light signal, for each pixel of the projected image, with an information segment comprising the pixel coordinates of the each image pixel of the plurality of image pixels;
   d. additionally encoding the temporal projector light signal with a color compensation segment configured to reproduce substantially the color of said each image pixel of the plurality of image pixels on the projection surface, wherein the information segment and the color compensation segment are time-multiplexed within the temporal projector light signal; and
   e. detecting the temporal light signal using a mobile device positioned within an illumination field of the projector and determining a position of the mobile device based on the detected temporal light signal, wherein the temporal projector light signal is a visible light signal.

2. The computer-implemented method of claim 1, wherein the pixel coordinates are descriptive of a location of the pixel within the image.

3. The computer-implemented method of claim 1, wherein the pixel coordinates are descriptive of a location of the pixel within a coordinate system of the projector.

4. The computer-implemented method of claim 1, wherein the temporal projector light signal is encoded with the pixel coordinates using a sequential binary code comprising a sequential plurality of light pulses.

5. The computer-implemented method of claim 4, wherein in the sequential binary code, a first binary digit is represented by a first light pulse followed by a first pause and a second binary digit is represented by a second pause followed by a second light pulse.

6. The computer-implemented method of claim 1, wherein the sequential plurality of light pulses of the temporal projector light signal are generated using a white color light.

7. The computer-implemented method of claim 1, wherein the color compensation segment comprises a sequential plurality of light pulses of a plurality of light colors.

8. The computer-implemented method of claim 7, wherein the light pulses in the sequential plurality of light pulses have widths determined based on the color value of the corresponding image pixel.

9. The computer-implemented method of claim 7, wherein the sequential plurality of light pulses comprises a red light pulse, a green light pulse and a blue light pulse, wherein the widths of the red light pulse, the green light pulse and the blue light pulse are determined based on the color value of the corresponding image pixel in an RGB color space.

10. The computer-implemented method of claim 1, further comprising using the determined position of the mobile device to cause the computerized system or the mobile device to perform a predetermined action.

11. A non-transitory computer-readable medium embodying a set of computer-executable instructions, which, when executed in connection with a computerized system comprising a processing unit, a memory and a projector, cause the computerized system to perform a method comprising:
   a. receiving an image data, the image data comprising at least a color value for each of a plurality of pixels of an image, the color value representing a color of said each of the plurality of image pixels, wherein each of the plurality of image pixels is characterized by pixel coordinates;

b. causing the projector to project a temporal light signal to create a projection of the image on a projection surface;
c. encoding the temporal projector light signal, for each pixel of the projected image, with an information segment comprising the pixel coordinates of the each image pixel of the plurality of image pixels;
d. additionally encoding the temporal projector light signal with a color compensation segment configured to reproduce substantially the color of said each image pixel of the plurality of image pixels on the projection surface, wherein the information segment and the color compensation segment are time-multiplexed within the temporal projector light signal; and
e. detecting the temporal light signal using a mobile device positioned within an illumination field of the projector and determining a position of the mobile device based on the detected temporal light signal, wherein the temporal projector light signal is a visible light signal.

12. The non-transitory computer-readable medium of claim 11, wherein the temporal projector light signal is encoded with the pixel coordinates using a sequential binary code comprising a sequential plurality of light pulses.

13. The non-transitory computer-readable medium of claim 12, wherein in the sequential binary code, a first binary digit is represented by a first light pulse followed by a first pause and a second binary digit is represented by a second pause followed by a second light pulse.

14. The non-transitory computer-readable medium of claim 11, wherein the sequential plurality of light pulses of the temporal projector light signal are generated using a white color light.

15. The non-transitory computer-readable medium of claim 11, wherein the color compensation segment comprises a sequential plurality of light pulses of a plurality of light colors.

16. The non-transitory computer-readable medium of claim 15, wherein the light pulses in the sequential plurality of light pulses have widths determined based on the color value of the corresponding image pixel.

17. The non-transitory computer-readable medium of claim 15, wherein the sequential plurality of light pulses comprises a red light pulse, a green light pulse and a blue light pulse, wherein the widths of the red light pulse, the green light pulse and the blue light pulse are determined based on the color value of the corresponding image pixel in an RGB color space.

18. A computerized system comprising a processing unit, a projector and a memory storing a set of instructions, which, when executed by the processing unit, causes the computerized system to perform a method comprising:
a. receiving an image data, the image data comprising at least a color value for each of a plurality of pixels of an image, the color value representing a color of said each of the plurality of image pixels, wherein each of the plurality of image pixels is characterized by pixel coordinates;
b. causing the projector to project a temporal light signal to create a projection of the image on a projection surface;
c. encoding the temporal projector light signal, for each pixel of the projected image, with an information segment comprising the pixel coordinates of the each image pixel of the plurality of image pixels; and
d. additionally encoding the temporal projector light signal with a color compensation segment configured to reproduce substantially the color of said each image pixel of the plurality of image pixels on the projection surface, wherein the information segment and the color compensation segment are time-multiplexed within the temporal projector light signal; and
e. detecting the temporal light signal using a mobile device positioned within an illumination field of the projector and determining a position of the mobile device based on the detected temporal light signal, wherein the temporal projector light signal is a visible light signal.

19. The computerized system of claim 18, wherein the temporal projector light signal is encoded with the pixel coordinates using a sequential binary code comprising a sequential plurality of light pulses.

* * * * *